United States Patent
Khambanonda et al.

(10) Patent No.: US 10,198,409 B2
(45) Date of Patent: Feb. 5, 2019

(54) ADAPTING MULTIPLE COLUMN LAYOUT TO A SINGLE COLUMN BASED ON DATA RELEVANCY

(71) Applicant: MICROSOFT TECHNOLOGY LICENSING, LLC, Redmond, WA (US)

(72) Inventors: Panuruj Khambanonda, Bellevue, WA (US); Joel Schweitzer, Kirkland, WA (US); Annice Jumani, Seattle, WA (US); Carolina Hernandez, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 35 days.

(21) Appl. No.: 14/164,161

(22) Filed: Jan. 25, 2014

(65) Prior Publication Data

US 2015/0212985 A1     Jul. 30, 2015

(51) Int. Cl.
   *G06F 17/20* (2006.01)
   *G06F 17/22* (2006.01)
   *G06F 17/21* (2006.01)
   *G06F 17/30* (2006.01)

(52) U.S. Cl.
   CPC ........ *G06F 17/2247* (2013.01); *G06F 17/218* (2013.01); *G06F 17/227* (2013.01); *G06F 17/30905* (2013.01)

(58) Field of Classification Search
   None
   See application file for complete search history.

(56) References Cited

U.S. PATENT DOCUMENTS

| | | | |
|---|---|---|---|
| 8,438,312 B2 | 5/2013 | Kapur et al. | |
| 9,007,405 B1* | 4/2015 | Eldar | G09G 5/02 345/666 |
| 9,753,901 B1* | 9/2017 | Xu | G06F 17/2247 |
| 2003/0046318 A1* | 3/2003 | Schohn | G06F 17/2229 715/255 |
| 2003/0179189 A1* | 9/2003 | Lira | G06F 3/0485 345/173 |

(Continued)

OTHER PUBLICATIONS

Villega, Pere, "Responsive Design and Mobile First", Published on: Jul. 22, 2012, Available at: http://perevillega.com/post/2012/07/22/23/responsive-design-and-mobile-first/#.UidUhrUczxo.

(Continued)

*Primary Examiner* — Keith D Bloomquist
(74) *Attorney, Agent, or Firm* — Alleman Hall Creasman & Tuttle LLP (57) ABSTRACT

Systems and methods are disclosed regarding the positioning related data in a browser on a client device received from a server. The browser on the client device is capable of being resized in a number of potential sizes—e.g., desktop browser viewport, laptop browser viewport, tablet browser viewport and mobile browser viewport. Related data may comprise main data, relevant data and ancillary data. Depending on the browser viewport and the relevancy of the data to be displayed, one embodiment may dynamically position the relevant data to be near the top of the main data. Alternatively, ancillary data may be dynamically positioned to be near the bottom of the main data.

22 Claims, 5 Drawing Sheets

(56) References Cited

U.S. PATENT DOCUMENTS

2007/0074108 A1* 3/2007 Xie .................... G06F 17/2229
715/234
2007/0204220 A1* 8/2007 Petrov Nickolov et al. ................
715/530
2008/0301545 A1* 12/2008 Zhang et al. ................. 715/235
2013/0219024 A1 8/2013 Flack

OTHER PUBLICATIONS

"Responsive Web Design", Retrieved on: Sep. 11, 2013, Available at: http://documentation.magnolia-cms.com/display/DOCS/Responsive+Web+design.
"Responsive Web Design Techniques, Tools and Design Strategies", Published on: Jul. 22, 2011, Available at: http://mobile.smashingmagazine.com/2011/07/22/responsive-web-design-techniques-tools-and-design-strategies/.
Sanderson, Steven, "Build a Better Mobile Browsing Experience", Published on: Jul. 2011, Available at: http://msdn.microsoft.com/en-us/magazine/hh288079.aspx.
Johnson, Joshua, "5 Really Useful Responsive Web Design Patterns", Published on: Mar. 27, 2012, Available at: http://designshack.net/articles/css/5-really-useful-responsive-web-design-patterns/.
"Responsive Email Design", Published on: Jul. 7, 2012, Available at: http://www.campaignmonitor.com/guides/mobile/responsive/.

* cited by examiner

ADAPTING MULTIPLE COLUMN LAYOUT TO A SINGLE COLUMN BASED ON DATA RELEVANCY

BACKGROUND

On many websites today, it is common to see articles arranged in 2-a-column layout. The near column may be the largest one and may have the main text of the article. The far column may be smaller in width and may contain supplemental information for the article. Often times, the supplemental information is either related to the article directly—e.g., such as a table of contents for a long article, or a list of related articles to be read.

On a responsive website, it may be desirable to adapt these templates to reflow the page in accordance with some notions and/or metrics of data relevancy. On conventional websites, the order of the columns is often presented regardless of the data relevancy, which tends to lead to a poor layout and a less than desirable user experience.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Systems and methods are disclosed regarding the positioning related data in a browser on a client device received from a server. The browser on the client device is capable of being resized in a number of potential sizes—e.g., desktop browser viewport, laptop browser viewport, tablet browser viewport and mobile browser viewport. Related data may comprise main data, relevant data and ancillary data. Depending on the browser viewport and the relevancy of the data to be displayed, one embodiment may dynamically position the relevant data to be near the top of the main data. Alternatively, ancillary data may be dynamically positioned to be near the bottom of the main data.

In one embodiment, a method for implementing an responsive UI is disclosed for rendering a set of related data across a plurality of browser viewports, the method comprising: inputting a set of related data, said set of related data capable of being rendered in a browser for a user of a computer system; detecting the viewport of the browser in which said set of related data are to be rendered; if the viewport is less than a desired size, then rendering said set of related data in a first format, said first format positioning said set of related data in a single column depending on the relevance of said data to the main data; if the viewport is greater or equal than a desired size, then rendering said set of related data in a second format, said second format comprising the main data, the relevant and the ancillary data substantially in at least a two-column layout; and if the browser is resized to another screen size, rendering said set of related data as appropriate for said resized screen.

In another embodiment, a computer system is disclosed comprising: a processor; a computer readable memory, said computer readable memory capable of storing computer readable data and instructions; a communications component, said communications component capable of receiving a set of nested data categories from a second computer system external to said computer system; a screen, said screen capable of rendering data and displaying said data to a user of said computer system; a set of UI components, said set of UI components capable of being used by said user to interact with said data rendered on said screen; and a browser, said browser capable of being resized into one of a plurality of viewports and rendering said set of related data according to the relevancy of the data and current viewport of said browser.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

As utilized herein, terms "component," "system," "interface," "controller" and the like are intended to refer to a computer-related entity, either hardware, software (e.g., in execution), and/or firmware. For example, any of these terms can be a process running on a processor, a processor, an object, an executable, a program, and/or a computer. By way of illustration, both an application running on a server and the server can be a component and/or controller. One or more components/controllers can reside within a process and a component/controller can be localized on one computer and/or distributed between two or more computers.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Exemplary Environment

In many embodiments of the present systems and methods, adaptive UIs for adapting multiple column layouts (e.g., to a single column layout) may reside and be implemented in a number of places—either singly or in combination—within a variety of typical computing and networking environments. For example, such adaptive UIs may reside on a single computing device or may reside on a server that is connected to various computing devices via a wired or wireless network.

Figure 1:
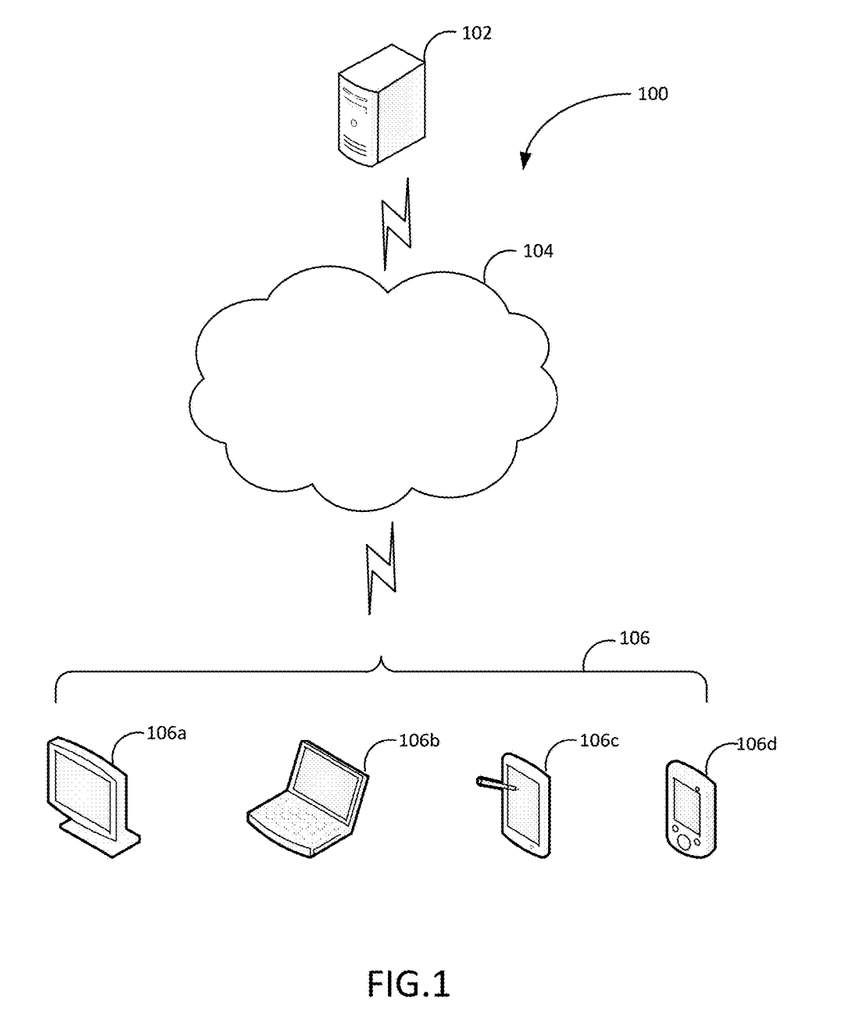
FIG. 1 depicts one exemplary environment in which present systems, methods and/or techniques may reside, as made in accordance with the principles of the present application.

FIG. 1 is one exemplary environment (100) in which the present systems and techniques of the present application may reside and/or be implemented. As mentioned, the present systems and/or methods may reside on a server 102 that may affect the adaptive UI (as disclosed herein) via a network 104 (e.g. Internet or other networking configuration) to one or more client computers 106. Computers 106 may comprise any possible computing device; and more particularly, two different computing devices have different display screen sizes (upon which various data/metadata may be rendered—e.g., webpages having data/metadata formatted for a particular screen size). For example, computing devices 106 may comprise desktop 106a, laptop 106b, tablet 106c and/or smart device/phone 106d.

In one embodiment, the server may render enough markup to support any screen size, and a rendering decision may be made on the device via a combination of CSS and JavaScript. For this embodiment, it may suffice that the only communication between device and server is for the page request and response.

In a different embodiment, it may be possible that a device may communicate (e.g., via any known protocol) to server and indicate to server what display screen size the device may have. In such a case, server may affect an adaptive UI experience to the user of the device, possibly depending upon what the user of the device may do in order to structure data within a browser that may be re-sized upon the display screen.

For one exemplary event, a user on a desktop may resize a browser to another viewport—e.g., increase the viewport to utilize the full screen of the desktop. But, in another case, the user may desire to shrink the browser/viewport to a smaller size (e.g., the size approximating a desktop screen size, a laptop screen size, tablet size and/or smart device size) in order to arrange the user's view of the various other information windows and/or viewports on the display screen. A common example might be the user has a browser open on the display screen; but may desire to dynamically resize the browser—e.g., so as to view other information such as a word processing document to work concurrently while viewing the browser.

As mentioned, the systems and methods of the present application may be used in other than a client-server setting—e.g., as on an individual computing devices. The present systems may reside in the operating system, applications, or in another part of the computing device.

Figure 2:
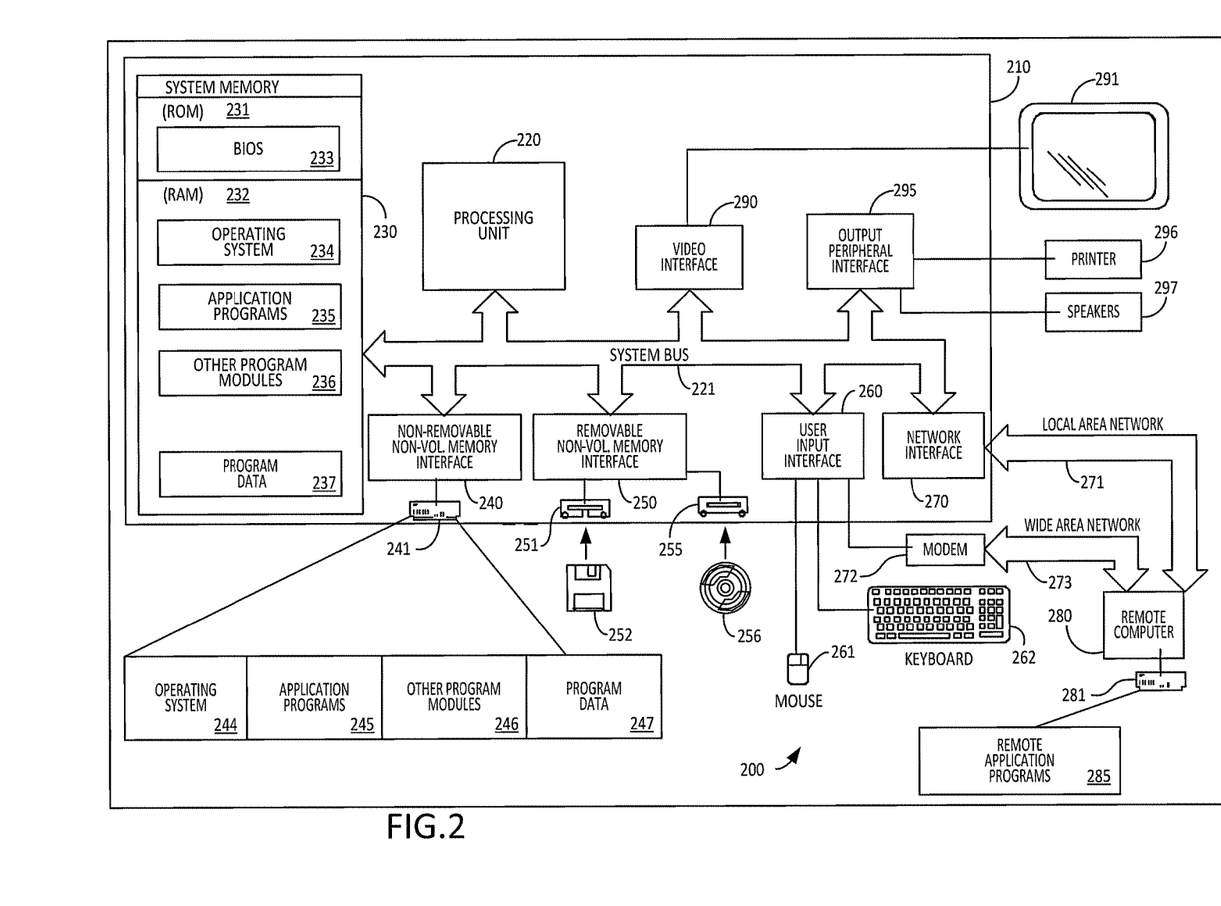
FIG. 2 shows one embodiment of an exemplary computer system that may run and/or host the methods and/or techniques of the present application.

FIG. 2 illustrates an example of a suitable computing system environment 200 in which the present systems and/or methods may be implemented, in whole or in part on, e.g., computers 106 (106a, 106b, 106c and/or 106d). The computing system environment 200 is only one example of a suitable computing environment and is not intended to suggest any limitation as to the scope of use or functionality of the present application. Neither should the computing environment 200 be interpreted as having any dependency or requirement relating to any one or combination of components illustrated in the exemplary operating environment 200.

The present systems/methods may be operational with numerous other general purpose or special purpose computing system environments or configurations. Examples of well-known computing systems, environments, and/or configurations that may be suitable for use with the present application include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The present application may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the present system/method may comprise a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Overview of Adaptive UI Environments

Figure 3:
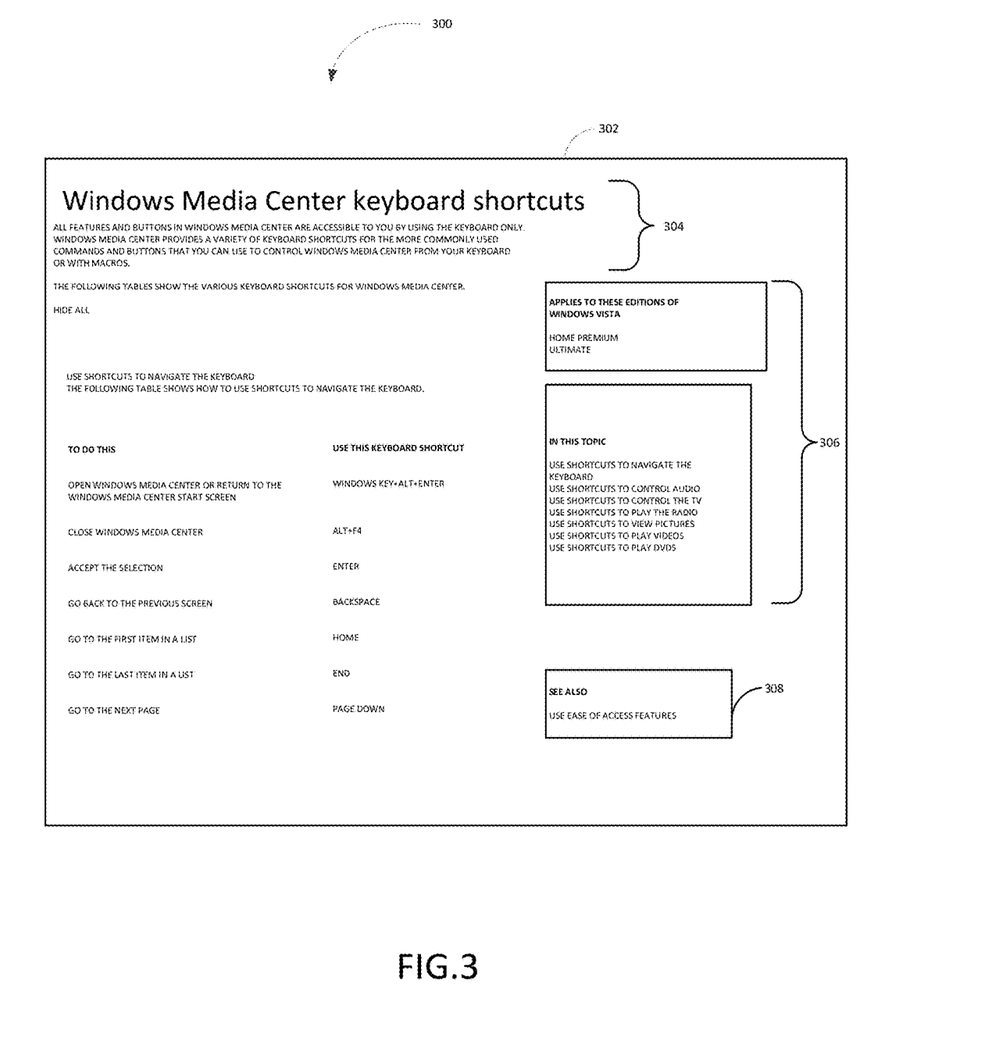
FIGS. 3 and 4 depict the dynamic behavior of an adaptive/responsive UI that employs data relevancy across a number of browser viewports.
Figure 4:
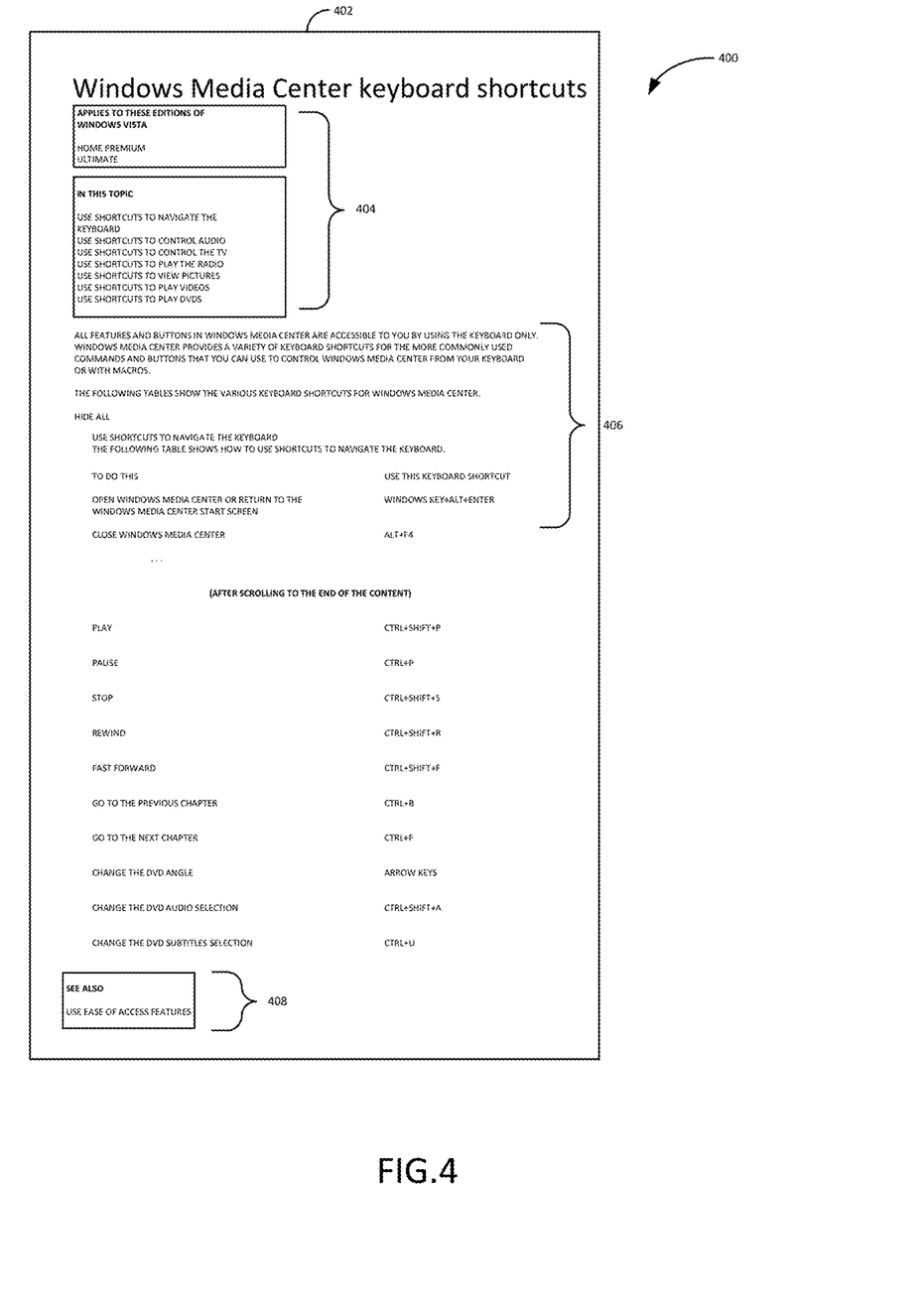

One embodiment of the present application will now be discussed in the context of the FIGS. 3, 4 and 5. In one embodiment, the adaptive UI comprising a nested data categorization control may change its interaction model for switching between data categories and content layout—e.g., based on the size of the viewport. FIGS. 3 and 4 depict such an embodiment and provide details about how the nested UI may adapt based on viewport size.

In many embodiments, the adaptive UI may receive or otherwise input a set of nested data categories. For example, the set of nested data categories may represent a set of subject matter related data (e.g., as seen here in the figures, data that may relate to different operating systems). In addition, the set of nested data categories may be nested to multiple (e.g., two or more) levels of logic—e.g., wherein different level may have click targets for the browser or otherwise functional logic with which the user may interact.

In addition to the dynamic change of creating different click targets in some adaptive UIs, it is possible and/or desirable to have the system dynamically change the order, arrangement and/or position of some information that may be relevant to the main article and/or information—e.g., on a webpage. Such dynamical change in position and/or order of information may be dependent on the relevancy of the data to the main article.

For the present expository purposes, the adaptive UI will now be described in the context of responsive tab control—e.g., such as may be found on responsive web designs that may be employed by websites or other portals. This context is merely used for the purposes of exposition and is not meant to limit the application of the present systems, methods and/or techniques of the present application.

Broadly speaking, modern tab control has two supported variants—horizontal and vertical. For one example (as is known in the art), a horizontal tab control may comprise different parts: a title, area for tabs and, possibly a dropdown menu. These parts may typically be displayed horizontally across a display screen and is capable of being interactive with the user. A typical vertical tab control may comprise a title and an area for tabs. In this example, the area for tabs may be displayed underneath the title and may be capable being interactive with the user. If one theme in the area for tabs is activated, then there may be another column displayed which may have content that is germane or associated with the theme.

Adaptive UI Embodiments Involving Data Relevancy

As mentioned above, these systems and/or methods take into account the data relevancy to be displayed in any browser viewport and reflows the page accordingly. For merely one example, FIGS. 3 and 4 depict one illustrative example of the present application. Browser viewport 300 may depict a first browser viewport, e.g., perhaps of a large size, like a desktop and/or laptop viewport. On the webpage 302 displayed in this first browser viewport, there may be a main article 304 (e.g., in this case, an article about keyboard shortcuts). As may also be seen, off to the right side, there may be data items 306 which are associated as relevant to the main article. Other ancillary and/or related items 308 may be placed below the relevant data items 306.

FIG. 4 depicts what happens to the relevant and ancillary data when the browser viewport 402 is dynamically resized (e.g., shrunk) to a smaller viewport—e.g., tablet and/or mobile viewport. As may be seen in this embodiment, any items that are relevant about the article 404, such as metadata or a table of contents gets floated to the top of the article 406 and any links to other content gets floated to the bottom of the article 408. In such an embodiment, the data relevancy is kept no matter the size of the browser's viewport.

In one embodiment, it may be desirable for a responsive web design that the presentation of the content change to optimize user experience for any screen sizes (e.g., phones, tablets, laptop, desktop computers, and/or TVs). For one example, most Windows help topics contain one or many of the following components: (1) "Applies-to-Products" information, (2) Table of content and (3) Related links. These information are considered as complementary information to the main help topic. One possible implementation may use the HTML5 <aside> element which gives an appropriate context to the information. The implementation may also use WAI-ARIA accessibility standard to allow assistive technology to identify this information as complementary.

In one embodiment, for search engine optimization purposes, this technique may avoid duplicating content on the page which may tend to potentially negatively affect the quality rating of the content. This technique also allows search engines to identify sections that contain complementary information to improve search result relevancy.

This is illustrated in Table 1 below. The implementation starts from designing the rendering of the page using XSLT technology to render the content in the natural flow. The first two components (if present) may be grouped into an "aside" section above the main content. The last component may be placed into an "aside" section below the main content.

TABLE 1

Responsive Ul According to Data Relevancy

```
<div class="topic_with_sidebar Tutorial">
    <h1 class="title_article matXL">
    Use Ease of Access features in <span
class="notLocalizable">Windows</span> Media Center
    </h1>
    <aside class="topic_sidebar_top" role="complementary">
        <div class="skuIndicator">
```

TABLE 1-continued

Responsive Ul According to Data Relevancy

```
        <h2 class="headingBase headingS saHeadingS">
            Applies to these editions of <span
class="notLocalizable">Windows Vista</span>
        </h2>
        <div style="height:3px;" class="vert-buff"></div>
        <p class="para">Home Premium</p>
        <p class="para">Ultimate</p>
    </div>
    <div class="miniToc">
        <h3 class="title_miniToc">In this topic</h3>
        <ul>
            <li><a href="#section_1" logginginteractiontypeid="none" data-id="pageContainer0_ID0EPB">Using Narrator</a></li>
            <li><a href="#section_2" logginginteractiontypeid="none" data-id="pageContainer0_ID0EIC">Using a screen magnifier</a></li>
            <li><a href="#section_3" logginginteractiontypeid="none" data-id="pageContainer0_ID0EID">Activating Descriptive Video Service (DVS)</a></li>
        </ul>
    </div>
  </aside>
  <div class="topic_body">
    ... main content ...
  </div>
  <aside class="topic_sidebar_bottom" role="complementary">
    <div class="relatedLinks">
        <h3 class="title_relatedLinks">See also</h3>
        <ul>
            <li><a href="http://pk-wolvm1.redmond.corp.microsoft.com/en-us/windows-vista/turn-on-high-contrast-in-windows-media-center" class="navigationLink" data-id="pageContainer0_ID0EIF">Turn on high contrast</a></li>
            <li><a href="http://pk-wolvm1.redmond.corp.microsoft.com/en-us/windows-vista/show-closed-captions-or-subtitles-in-windows-media-center" class="navigationLink"
data-id="pageContainer0_ID0ERF">
Show closed captions or subtitles</a></li>
            <li><a href="http://pk-wolvm1.redmond.corp.microsoft.com/en-us/windows-vista/windows-media-center-keyboard-shortcuts" class="navigationLink" data-id="pageContainer0_ID0E1F">Keyboard shortcuts</a></li>
        </ul>
    </div>
  </aside>
</div>
```

The presentation of the help topic on small-to-medium screen (below 900 pixels) is in this logical order. The first aside section appears before the main content; the second aside section appears below the content. When the browser is resized larger or when using a larger device, the help topic transforms into the 2-column layout. In one embodiment, the transform may be triggered by using CSS media query to apply a different set of styles. Both aside sections are given "float" style to allow the complementary information to be extracted out of the logical flow to the far side (e.g., right-side on left-to-right languages, left-side on bi-directional languages). Both of the aside sections then stack on top of each other on the far side while leaving the main content on the left side. This gives an effect of a single sidebar column to the content to optimize user experience on larger screen. Table 2 below is other code that helps to implement the logic as described above.

TABLE 2

Topic With Sidebar Logic

```
.topic_with_sidebar .topic_body
{
    float:left;
    width:74.248496994%;
```

TABLE 2-continued

Topic With Sidebar Logic

```
}
.topic_with_sidebar .topic_sidebar_top,
.topic_with_sidebar .topic_sidebar_bottom
{
   float:right;
   clear:right;
   width:22.745490982%;
}
@media screen and (max-width:56.24375em)
{
   .topic_with_sidebar .topic_body,
   .topic_with_sidebar .topic_sidebar_top,
   .topic_with_sidebar .topic_sidebar_bottom
   {
      float:none;
      width:auto
   }
   .topic_with_sidebar .topic_sidebar_top
   {
      margin-bottom:36px;
   }
}
```

One Possible Embodiment

Figure 5:
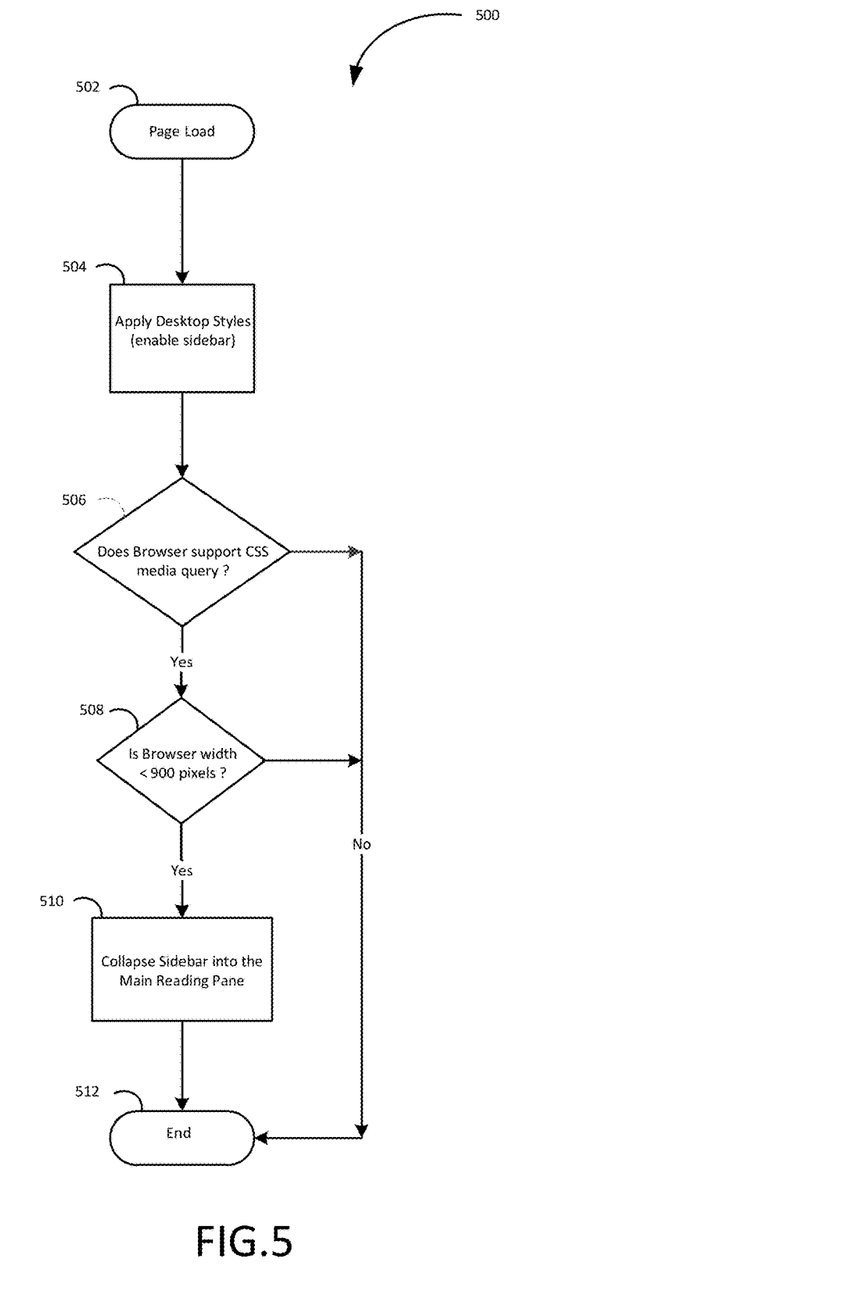
FIG. 5 depicts one embodiment of a flowchart that supports responsive UI as made in accordance with the principles of the present application.

FIG. 5 depicts one embodiment of a method/flowchart 500 that may implement the logic as described herein. The method starts a 502, possibly by loading a web page that uses responsive UI. At 504, the method may apply the largest viewport as is possible, for example (in the example of FIGS. 3 and 4), apply a desktop style and enable sidebars for further information.

At 506, the method may query as to whether the browser supports CSS media query. If not, the method may proceed to the end at 512. However, if it does, then the method may further query as to whether the browser width is less than a certain number of threshold/breakpoint pixels (e.g., 900 pixels in this case, other thresholds are of course possible) at 508. If not, then the browser viewport may not be changed and/or changing and the system may proceed to end 512.

However, if the browser width is less than a threshold/breakpoint size, then the system and/or method may collapse the sidebar (which may represent relevant data) at 508. It will be appreciated that the method of FIG. 5 may be running as a continuous loop and that the data may be resized into a laptop, tablet and/or mobile format as well—e.g., with different breakpoint and size resized as desired. Different thresholds and/or breakpoints may be associated with the various viewports.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A method, comprising:
   receiving data configured for rendering in a browser executed on a computer system, the data comprising a plurality of markup elements;
   identifying, via selected markup, a main set of the data, a relevant set of the data, and an ancillary set of the data;
   detecting a size of a viewport of the browser;
   in response to detecting that the size of the viewport is greater than or equal to a desired size, rendering the data including the main set, the relevant set, and the ancillary set in a first format comprising two or more columns, the relevant set and the ancillary set being rendered in a second column of the two or more columns based on a relevance of the relevant set specified by corresponding markup and a relevance of the ancillary set specified by corresponding markup, respectively; and in response to detecting that the size of the viewport is less than the desired size, rendering the data including the main set, the relevant set, and the ancillary set in a second format comprising a single column, the relevant set being rendered above the main set based on a location specified by corresponding markup, and the ancillary set being rendered below the main set based on a location specified by corresponding markup.

2. The method of claim 1 wherein the relevant set of the data comprises a set of subject matter related data.

3. The method of claim 1 wherein detecting the size of the viewport of the browser comprises detecting resizing of the viewport by via user interface components of the computer system.

4. The method of claim 1 wherein detecting the size of the viewport of the browser comprises detecting a user sizing of the browser or detecting a setting from a server.

5. The method of claim 1 wherein detecting the size of the viewport of the browser comprises detecting resizing of the viewport by an application running on the computer system.

6. The method of claim 1 wherein in the second format the relevant set of the data is rendered substantially near a top of the main set of the data.

7. The method of claim 1 wherein in the second format the ancillary set of the data is rendered substantially near a bottom of the main set of the data.

8. The method of claim 1 wherein the relevant set of the data comprises metadata or a table of contents, and wherein the ancillary set of the data comprises related links.

9. The method of claim 1 wherein the relevant set and the ancillary set are rendered in the second column based further on corresponding float styles respectively specified for the relevant set and the ancillary set.

10. A computer system comprising:
a processor;
a computer readable memory, said computer readable memory storing computer readable instructions executable by the processor to:
receive data configured for rendering in a browser executed on the computer system, the data comprising a plurality of markup elements;
identify, via selected markup, a main set of the data, a relevant set of the data, and an ancillary set of the data;
detect a size of a viewport of the browser;
in response to detecting that the size of the viewport is greater than or equal to a desired size, render the data including the main set, the relevant set, and the ancillary set in a first format comprising two or more columns, the relevant set and the ancillary set being rendered in a second column of the two or more columns based on a relevance of the relevant set specified by corresponding markup and a relevance of the ancillary set specified by corresponding markup, respectively; and
in response to detecting that the size of the viewport is less than the desired size, render the data including the main set, the relevant set, and the ancillary set in a second format comprising a single column, the relevant set being rendered above the main set based on a location specified by corresponding markup, and the ancillary set being rendered below the main set based on a location specified by corresponding markup.

11. The system of claim 10 wherein the data is received from a webpage.

12. The system of claim 10 wherein the instructions are further executable to, in response to the viewport of the browser being resized to another size, render the data as appropriate for the resized size.

13. The system of claim 10 wherein the viewport is capable of being resized into a tablet viewport, a laptop viewport, or a desktop viewport.

14. On a computer system, a method comprising:
requesting data from a webpage hosted on a server, the server remote from said computer system, the data configured for rendering in a browser executed on the computer system and comprising a plurality of markup elements;
downloading the data from the webpage;
identifying, via selected markup, a main set of the data, a relevant set of the data, and an ancillary set of the data;
detecting a size of a viewport of the browser;
in response to detecting that the size of the viewport is greater than or equal to a desired size, rendering the data including the main set, the relevant set, and the ancillary set in a first format comprising two or more columns, the main set being rendered in a first column and the relevant set and the ancillary set being rendered in a second column based on a relevance of the relevant set specified by corresponding markup and a relevance of the ancillary set specified by corresponding markup, respectively; and
in response to detecting that the size of the viewport is less than the desired size, rendering the data including the main set, the relevant set, and the ancillary set in a second format comprising a single column, the relevant set being rendered above the main set based on a location specified by corresponding markup, and the ancillary set being rendered below the main set based on a location specified by corresponding markup.

15. The method of claim 14 wherein the relevant set of the data comprises a set of subject matter related data.

16. The method of claim 14 wherein detecting the size of the viewport of the browser comprises detecting resizing of the viewport by user interface components of the computer system.

17. The method of claim 14 wherein detecting the size of the viewport of the browser comprises detecting a user sizing of the browser or detecting a setting from a server.

18. The method of claim 14 wherein detecting the size of the viewport of the browser comprises detecting resizing of the viewport by an application running on the computer system.

19. The method of claim 14 wherein the relevant set of the data comprises metadata or a table of contents, and wherein the ancillary set of the data comprises related links.

20. The method of claim 14 wherein the plurality of markup elements comprises a Hypertext Markup Language, version 5, <aside> element.

21. The method of claim 14 wherein the viewport is capable of being resized into a tablet viewport, a laptop viewport, or a desktop viewport.

22. The method of claim 14 further comprising, in response to the viewport of the browser being resized to another size, rendering the data as appropriate for the resized size.

* * * * *